Sept. 12, 1967 FRITZ-WERNER BEYERLEIN 3,341,367

METHOD FOR TREATING THE SURFACE OF SEMI-CONDUCTOR DEVICES

Filed April 23, 1963

United States Patent Office 3,341,367

Patented Sept. 12, 1967

3,341,367

METHOD FOR TREATING THE SURFACE OF SEMICONDUCTOR DEVICES

Fritz-Werner Beyerlein, Munich, Germany, assignor to Siemens & Halske Aktiengesellschaft, Berlin, Germany, a corporation of Germany Filed Apr. 23, 1963, Ser. No. 275,107

Claims priority, application Germany, Apr. 25, 1962, S 79,160

7 Claims. (Cl. 148—1.5)

My invention relates to a method of treating the surface of p-n junction semiconductor devices for improved reverse-current stability and current-amplifying gain.

It has been found that the reverse current through a p-n junction, when applying a constant reverse voltage, does not maintain a constant value for the duration of the voltage or voltage pulse, but varies progressively and attains a saturation value only upon a relatively very long period of time. This time dependence of the inverse current at a constant inverse voltage is particularly pronounced when the ambient atmosphere has a high humidity content.

It has further been found that in transistors, four-layer trigger diodes, silicon controlled rectifiers and other plural-junction devices, the current amplification or gain is dependent upon temperature-storage-time conditions. During prolonged temperature loading, as may occur for example in the normal operation of the semiconductor device, a drop in current amplifying gain has been observed. Such drop in gain can be reduced by increasing the humidity content of the ambient atmosphere, but then the above-mentioned dependence of the inverse current upon the duration of the reverse voltage will manifest itself.

It is therefore a more specific object of my invention to provide p-n junction semiconductor devices that afford an improved constancy of the reverse current for constant reverse voltage, conjointly with improved temperature and time stability of the current gain.

I have discovered, according to the invention, that such improved semiconductor devices, exhibiting stable inverse current values even under high humidity conditions, are obtained by treating the semiconductor surface, particularly the localities at which the p-n junction emerges at the surface, with derivatives of quinoid or ketoid ring compounds that carry an OH-group in the second position to the >C=O-group, this treatment being applied immediately after applying the conventional etching process. The treatment has also the effect of avoiding to a great extent the drop in current amplication under prolonged effects of elevated temperature, even under low humidity conditions.

More specifically, the surface treatment of the semiconductors, immediately after conventional etching, is effected with quinoid or ketoid ring compounds having at least one

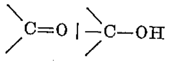

grouping of the type:

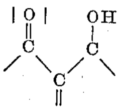

Typical examples of such compounds are the 1,2-dihydroxyanthraquinone (M.P.=290° C.); anthrapurpurin, namely 1,2,7-trihydroxyanthraquinone (M.P.=369° C.) or the corresponding 1,2,8-compound (M.P.=325° C.); 1,3 - dihydroxyanthraquinone (M.P.=262° C.); and 1-hydroxyanthraquinone, which sublimates at 100° C. The numbers in these formulas designate the attachment locations of the OH-groups as usual. The parenthetical temperatures M.P. are the respective melting points of these compounds.

It has been found particularly advantageous to employ 1,2,7-trihydroxyanthraquinone.

Preferably employed in the process according to the invention are derivatives whose melting point is above 100° C. because then the drying of the semiconductor devices after being treated with the compounds can be effected at relatively high temperatures without damaging the coating formed by the treatment. Also applicable are two or more mutually miscible derivatives of the above-mentioned type.

The compounds are generally available in pulverulent form. They are brought in contact with the semiconductor surface to be treated, in form of a solution, for example in alcohol.

According to another embodiment of the invention, the powder is worked with a liquid agent, for example silicone oil, into a doughy or pasty mass which is then deposited upon the semiconductor surface or is filled into the housing that encloses the semiconductor device proper, preferably together with a drying medium such as silica gel, $B_2O_3$, CaO, or sodium aluminum silicate or calcium aluminum silicate which are also designated as molecular sieves.

It is essential that the treatment with the quinoid or ketoid derivatives is performed immediately after etching the surface, namely before an oxide coating has formed upon the semiconductor surface.

One way of performing the process according to the invention is as follows. The semiconductor device, provided with a p-n junction in any suitable manner, for example by alloying or diffusing a doping substance into the semiconductor crystal, is first etched as usual. Immediately thereafter, the semiconductor body is immersed in an alcohol bath to which has been added a derivative, in pulverulent form, of a quinoid or ketoid ring compound having an OH-group attached in the second position to >C=O-grouping. Thereafter the treated objects are dried, for example in a drying furnace for several, for example sixteen, hours. The drying temperature must remain below the melting point of the derivative employed. Consequently, depending upon the particular compound used, the drying temperature may be approximately 100° C., or also at a relatively high temperature such as 250° C. or more.

Described presently is an example of the method relating to the processing of a semiconductor device consisting of a p-n junction wafer of germanium with electrodes. The semiconductor device is first immersed in a commercial etching solution obtainable in the trade under the designation CP4 and having the following approximate composition: 27% concentrated acetic acid, 45% nitric acid of 70% concentration, 27% hydrofluoric acid of 48% concentration, and 0.5% bromine. The period of immersion is between 30 and 600 seconds, depending upon the size of the semiconductor device and the desired etching depth. Then the etched device is repeatedly rinsed with distilled water and immediately thereafter immersed in an alcoholic solution of the derivative saturated at normal room temperature (20° C.), namely of a 10% alcoholic solution of 1,2-dihydroxyanthraquinone. Used as solvent is methanol. The particular alcohol and the concentration of the alcoholic bath, however, are not critical; and the process can also be performed with an unsaturated solution or in a saturated solution with a bottom-body of undissolved compound remaining. The immersion period is very short and likewise not critical. Applied, for example, is an immersion for approximately 1 second. Thereafter the germanium device is removed from the bath and dried at a temperature of 85 to 125° C. As mentioned, the temperature best chosen for drying depends upon the derivative being employed as well as upon the particular semiconductor material being treated.

The invention will be further explained with reference to the accompanying drawing in which.

Figure 1:
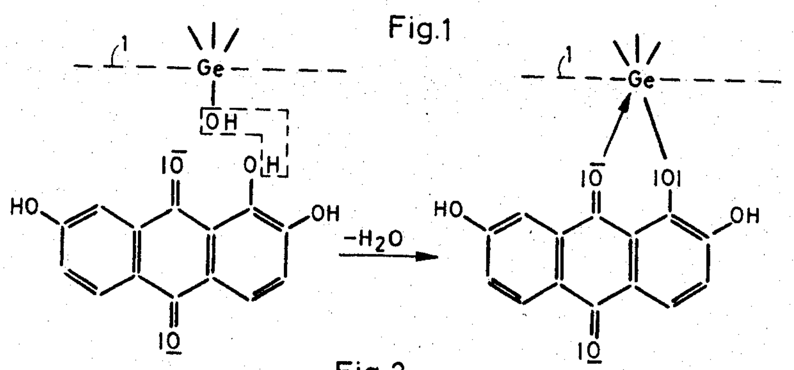
FIG. 1 is a schematic representation of the phenomena believed to occur when applying the process to the surface treatment of a germanium semiconductor device.

The improvement achieved by virtue of the invention can be explained on the assumption that the effect of the >C=O-grouping at the semiconductor surface results from an attachment or bond formation of the compound as explained presently with reference to FIG. 1. Denoted by 1 in FIG. 1 is the surface of the semiconductor body, namely the 111- or 110-surface of a germanium wafer. At the surface, the atoms of the semiconductor, for example germanium, are only partially saturated. The remaining free valences, which are responsible for the inconstancy of the p-n junction inverse current, are readily attachable by OH-groups. If now, according to the invention, the semiconductor surfaces are treated with derivatives of quinoid or ketoid ring compounds, for example with 1,2,7-trihydroxyanthraquinone (or with the corresponding 1,2,8-compound whose structural formula is represented in FIG. 1), then the subsequent drying of the semiconductor surface results, aside from condensation of water, in the formation of a surface coating from the OH-group that has become attached to the >C=O-grouping in the 2-position and the OH-group attached to the semiconductor surface. As indicated by an arrow, the germanium enters into a coordinative bond with the oxygen of the C=O-group relative to which the OH-group, entirely or partially split off during condensation of the $H_2O$, enters into 2-position. The six-ring compound thus resulting, including the germanium, is very stable. By the mutual attachment of the molecules, a reproducibly defined condition of the semiconductor surface is secured which retains its stability also at a high humidity content in the ambient atmosphere. The coating is not attacked even at high operating temperatures as long as they remain below the melting point of the derivative used.

Figure 2:
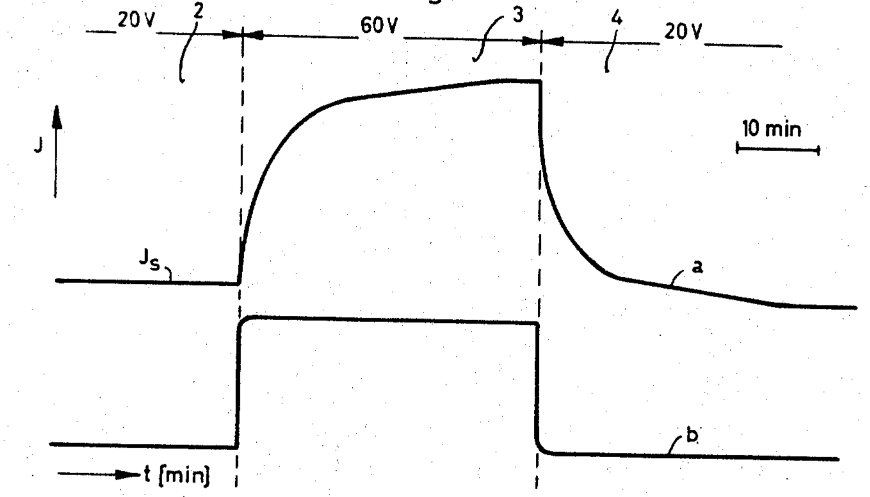
FIG. 2 is an explanatory graph showing inverse current versus time for different inverse voltages.

FIG. 2 shows the time curves of the inverse current at different inverse voltages for an ambient atmosphere of 60% relative humidity. Curve *a* relates to a p-n junction not subjected to the surface treatment according to the invention. The corresponding curve *b* represents the time characteristic of the inverse current measured with a p-n junction in the same (germanium) device surface-treated in accordance with the invention. The range denoted by 2 in FIG. 2 corresponds to an impressed inverse voltage of 20 v. In the specimen corresponding to curve *a*, the inverse current increased until, after a given period of time, the saturation value $J_s$ shown in the diagram was attained. In the specimen corresponding to curve *b* the inverse current was constant from the beginning.

When the inverse voltage was increased to 60 volts, according to range 3 in FIG. 2, the inverse current in case *a* varied continuously for about 35 minutes until it attained a saturation value, whereas in the case *b* corresponding to the present invention, the inverse current immediately assumed its utlimate value and maintained this value constant for the entire duration of the voltage pulse. When thereafter the voltage was reduced, in range 4, to 20 v., the inverse current in case *a* declined gradually and required a period of about 35 minutes until it attained a saturation value, whereas in case *b* according to the invention an ultimate value was assumed virtually immediately and then remained constant.

It is also apparent from FIG. 2 that by virtue of the surface treatment according to the invention, not only a stable inverse current reative to time is achieved but that the amount of inverse current for a given inverse voltage is simultaneously reduced.

Figure 3:
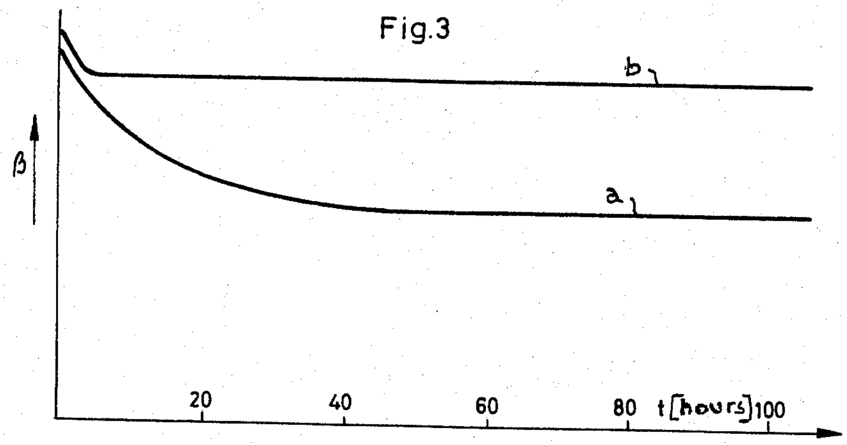
FIG. 3 is an explanatory graph relating to current gain of the p-n junction versus time.

The diagram shown in FIG. 3 indicates on the abscissa amounts of time in hours and on the ordinate values of current amplification of the p-n junction. The curves *a* and *b* are thus indicative of the temperature-storing time *t* in hours, relating to a temperature of 100° C. and a steam pressure of $pH_2O=10^{-5}$ mm. Hg, and hence of very slight humidity. The two curves relate to the same specimens except that the one represented by curve *b* was treated in accordance with the present invention, whereas curve *a* in FIG. 3 relates to the conventionally processed specimen. It is apparent from FIG. 3 that by virtue of the surface treatment according to the invention (curve *b*) a drop in current amplification under elevated temperature is avoided to a great extent.

The surface treatment according to the invention is applicable to advantage with all semiconductor devices having p-n junctions, for example diodes, semiconductor controlled rectifiers, transistors, or photo devices. The process is applicable to silicon or semiconducting $A^{III}B^{V}$ compounds in the same manner as described above for germanium.

I claim:

1. The method of treating the surface of p-n junction semi-conductor devices for improving reverse-current stability, which comprises etching the semiconductor surface, immediately thereafter contacting the etched semiconductor with substance selected from the group consisting of derivatives of quinoid and ketoid ring compounds having an OH-group in 2-position of the >C=O-grouping.

2. The method of treating the surface of p-n junction semiconductor devices, which comprises etching the semiconductor surface, immediately thereafter contacting the etched semiconductor with substances selected from the group consisting of derivatives of quinoid and ketoid ring compounds having an OH-group in 2-position of the >C=O-grouping and having a melting point above 100° C.

3. The method of treating the surface of p-n junction semiconductor devices, which comprises coating the semiconductor surface, immediately after etching, with anthrapurpurin in a fluid medium, and drying the device to obtain a coating on said surface.

4. The method of treating the surface of p-n junction semiconductor devices, which comprises contacting the semiconductor surface, immediately after etching, with 1,2,7-trihydroxyanthraquinone.

5. The method of treating the surface of p-n junction semiconductor devices, which comprises etching the semiconductor surface, immediately thereafter immersing the etched semiconductor into an alcoholic solution of substance selected from the group consisting of derivatives of quinoid and ketoid ring compounds having an OH-group in the second position of the >C=O-grouping, and drying the device to remove the solvent.

6. The method of treating the surface of p-n junction semiconductor devices, which comprises subjecting the semiconductor surface, immediately after etching, to reaction with a mixture of silicone oil and substance selected from the group consisting of derivatives of quinoid and ketoid ring compounds having an OH-group in the second position of the >C=O-grouping.

7. The method of treating the surface of p-n junction semiconductor devices, which comprises etching the semiconductor surface, immediately thereafter, bringing the etched surface in contact with substance selected from the group consisting of derivatives of quinoid and ketoid ring compounds having an OH-group in the second position of the >C=O-grouping, said substance being mixed with fluid diluent and drying agent.

References Cited

UNITED STATES PATENTS 3,160,520 12/1964 Jantsch et al. -------- 117—201

ALFRED L. LEAVITT, *Primary Examiner.*

WILLIAM L. JARVIS, *Examiner.*